June 3, 1958      P. A. SAWYER      2,837,087
APPARATUS FOR USE IN TREATING VISUAL DEFECTS
Filed May 24, 1952
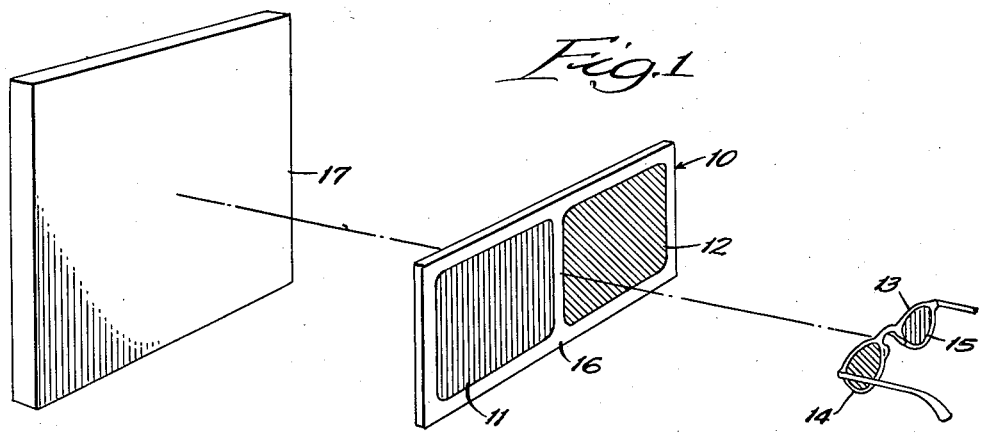
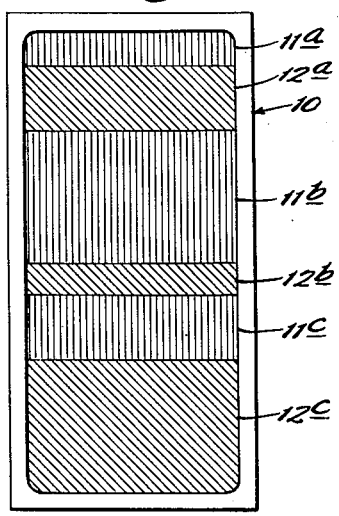 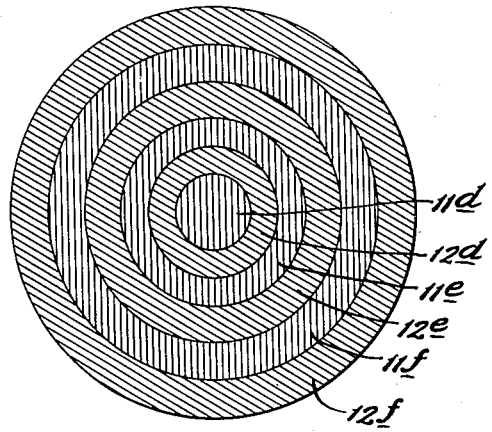
INVENTOR:
Priscilla A. Sawyer,
BY
Dawson & Ome,
ATTORNEYS.

United States Patent Office 2,837,087
Patented June 3, 1958

2,837,087
APPARATUS FOR USE IN TREATING VISUAL DEFECTS

Priscilla A. Sawyer, Chicago, Ill., now by change of name Priscilla Allen, assignor to American Optical Company, Southbridge, Mass., a voluntary association of Massachusetts Application May 24, 1952, Serial No. 289,765

13 Claims. (Cl. 128—76.5)

This invention relates to the treatment of certain defects in vision, and more particularly to apparatus for treating defects in vision such as lack of single binocular vision and other similar eye disorders wherein a person utilizes a single eye for seeing to the exclusion of the other even though the unused eye is capable of sight; or improperly or abnormally uses the two eyes together.

Certain eye defects such as lack of normal single binocular vision are characterized by the ability to see with either eye independently but difficulty is experienced when using both eyes simultaneously. The degree of difficulty varies from case to case and in some instances a person finds it virtually impossible to use both eyes together for seeing (an example is where the eyes are extremely crossed), and surgery must be resorted to to align the eyes before both eyes may be used normally. The latter cases constitute a small number of the total sufferers, and even when the surgery has made the eyes straight the difficulty of using both eyes together often still exists.

Since it is difficult for a person suffering lack of binocular vsion to focus both eyes on an object, he unconsciously falls into the habit of using a single eye for all sight and the unused eye becomes weakened and eventually loses vision through continued disuse. Proper training in teaching persons having such visual defects to use both eyes together will help overcome the defects and normal vision may be attained.

The best results are achieved when the training is started early in life and before disuse of one of the eyes has rendered it incapable of good vision. This means that the patients are very often children and must be aided and at times persuaded and coerced or motivated in some manner into using both of their eyes together; otherwise they unconsciously fall into the habit of using the one eye that is favored. In addition, the more time that can be spent each day in training the child to use both eyes, the more rapidly the child will learn to use both eyes at all times. The present invention is concerned with the problem of persuading or motivating the patients, particularly the children, into using both of their eyes.

An object of the invention, then, is to provide apparatus that can be used to train persons, particularly children, suffering the above discussed visual defects to use both eyes normally. Another object of the invention is to provide apparatus that may be used by persons away from the clinic and during their leisure time to help them to use both of their eyes normally. A further object is to provide apparatus that may be used in combination with television receivers and the like that will force persons to use both of their eyes if they are to see the entire picture or object. Still another object is to provide training apparatus for correcting visual defects, having pairs of spaced-apart light filters with complementary subtractive light filtering properties; the result being that visible light incident upon pairs of complementary subtractive filters is substantially eliminated thereby and the apparatus is arranged so that both eyes must be used to see an object through the filters. Still another object is to provide a light filter having a plurality of sections distinctively colored in two complementary subtractive colors and a pair of lenses for use therewith, each being of a color that is complementary subtractive to the color of one of the sections, so that visible light incident upon a filter section and a lens having complementary subtractive colors is substantially filtered out thereby and an object placed rearwardly of the filter cannot be totally seen except when viewed through both of the lenses at the same time. A still further object is to provide in apparatus for treating visual defects, a light filter having at least two light-polarizing sections oriented to polarize light in planes substantially at right angles to each other, and a pair of lenses spaced therefrom and having light-polarizing properties and being oriented to polarize light passing therethrough in planes substantially parallel with the polarizing planes of the sections with the result that visible light is restricted by each lens and a section to vibrations in a single plane, and visible light is substantially eliminated by a section and a lens having polarizing planes oriented at right angles to each other and an object placed rearwardly of the sections cannot be totally seen except when viewed through both lenses at the same time. Additional objects and advantages will appear as the specification proceeds.

My invention can be seen, in an illustrative embodiment, in the accompanying drawing, in which—

Figure 1 is a perspective view showing my light filter or screen, light filter lenses, and an object; Fig. 2, a front view in elevation of a modified form of the light filter; and Fig. 3, a front view in elevation of a further modified form of the light filter.

The purpose of my apparatus is to force or motivate persons suffering from the lack of proper binocular vision and other similar defects to use both eyes simultaneously when viewing an object. To this end, I employ a light filter or screen 10 having at least two sections 11 and 12 with different light filtering properties or characteristics. In combination with the light filter 10 I employ a pair of glasses 13 of the usual construction and equipped with lenses 14 and 15. The lenses 14 and 15 may be held in place within the frames of the glasses 13 in any ordinary and well known manner and, since retaining means are well known, a detailed description of the glasses, etc., is not believed necessary. Likewise, the light filter sections 11 and 12 may be supported in side-by-side relation by any desired framework or means. In the illustration the sections 11 and 12 are mounted within a frame 16.

Behind the screen or light filter 10 is an object 17. The object 17 may be anything that the patient desires to see or it may be anything or any object that it is desired to have the patient see or study, etc. I have found that where children are the patients, an object 17 of amusement or entertainment successfully attracts and holds the attention of a child and thereby provides an incentive or motivates him to use both eyes in an effort to see the object of attraction. Training in the use of both eyes simultaneously is thereby accomplished. It has been found particularly successful to use a television receiver so that the picture shown thereon may be seen by the patient. The object 17 may, therefore, represent the screen of a television receiver.

The spacing between the screen 10 and the object 17 is not critical and the spacing between the two will be determined to a great extent by the size and shape of the light filtering sections 11 and 12. If the sections 11 and 12 are fairly large, it may be desirable to place the filter 10 adjacent or even in abutting relationship with the object 17. On the other hand, if the sections 11 and 12 are relatively small in area with respect to the object 17, it will be necessary to move the screen 10 away from the object 17 to a point where the entire object may be seen easily through the filter sections 11 and 12.

The glasses 13 must be spaced at some distance from the filter screen 10. However, the precise spacing is in no sense critical. To prevent a patient from seeing the entire object through one of the lenses and one of the filter sections, some spacing between the glasses and filter must be provided and this will again depend upon the area of the sections 11 and 12 and may be determined easily by trial, etc. For the same reasons, it is desirable to maintain substantial alignment of the filter 10 and glasses 13 along an axis projecting outwardly from the object 17; the purpose here being to prevent the patient from moving both of the lenses 14 and 15 to a lateral position in front of either of the sections 11 or 12 so that the entire object may be seen through a single lens. The problems in this regard are substantially lessened by utilizing a light filter such as that shown in Fig. 2 which is equipped with a plurality of light filtering sections designated by the numerals 11a, 11b and 11c, and also by the numerals 12a, 12b and 12c; the plurality of sections making it more difficult, of course, to see all of the object 17 through a single lens and filter section. The sections 11 and 12 may be arranged in any desired manner, and a patchwork arrangement in which the sections are intermixed will render desirable results. The modified arrangement shown in Fig. 3, wherein a plurality of concentric sections 11d, 11e and 11f and 12d, 12e and 12f are provided, has been found desirable. The sections are preferably transparent and may be made of any suitable material such as plastic, glass, etc. The important consideration in arranging the sections is to insure that none of the adjacent sections are overlapping, for overlapping sections will create black or opaque spots on the screen.

The screen 10 and the lenses 14 and 15 are essentially a pair of light filters. The screen or filter 10 provides at least two light filtering sections 11 and 12 having different light filtering properties. The light filtering lenses 14 and 15 each have a light filtering property that is complementary subtractive to the filtering property of one of the sections 11 and 12. The term complementary subtractive is used to designate a pair of light filters that will substantially filter out or eliminate entirely the visible light incident successively on two of the filters having these properties. Specifically, the section 11 is transparent and is colored a definite color—for example, red. The section 12 is also transparent and is colored differently from the section 11 and, for example, may be colored green. Each of the lenses 14 and 15 is transparent and each is colored with a color that is complementary to the color of one of the sections 11 and 12. Thus, in the illustration one of the lenses is green and the other is red. It is preferred that the lens 14 be colored green while the lens 15 is red in color. With this arrangement, light reflected from the object 17 passes through the sections 11 and 12 and in so doing the section 11 absorbs substantially all of the visible light spectrum with the exception of red which passes therethrough, while at the same time the section 12 absorbs substantially all of the visible light spectrum with the exception of green which passes therethrough. Since the lens 14 which is colored green will absorb substantially all of the visible color spectrum with the exception of green, light passing through the section 11 which is colored red will be absorbed by the lens 14, since together the red and green absorb substantially all of the visible light spectrum. In attempting to see through the green lens and red section, the object 17 cannot be seen. The same result accrues with light that passes through the green section 12 and the red lens 15. Therefore, the only light reflected from the object 17 that can reach the eyes of a person wearing the glasses 13 is that which passes through the red section 11 of the filter and the red lens 15 of the glasses and also through the green section 12 and the green lens 14. Thus, the wearer of the glasses 13 is unable to see all of the object 17 by using only one eye, since he is only able to see through the green lens 14 the portion of the object behind the green section 12, and conversely, only the portion of the object 17 positioned behind the red section 11 is seen through the red lens 15.

The phrase complementary subtractive implies a pair of light filters colored differently from each other and with colors that together absorb substantially all of the visible light spectrum and make it impossible to see an object aligned with the filters such as the lenses and the filter sections. Red and green are complementary colors and together provide complementary subtractive light filters. There are other colors that would produce the same result, such as violet and yellow.

The phrase complementary subtractive light filters is to be construed broadly enough to include polarizing light filters. Although I prefer to use filters that are colored, I have found that the filter sections 11 and 12 may be composed of transparent light-polarizing material, such as polaroid or tourmaline, each of the sections being oriented to polarize light passing therethrough in planes substantially at right angles to each other. Thus, the section 11 may be oriented to polarize light in a vertical plane while the section 12 is oriented to polarize light passing therethrough in a horizontal plane. The glasses 13 are then equipped with lenses 14 and 15 composed of the transparent light-polarizing material, each of the lenses being oriented to polarize light passing therethrough in planes substantially parallel with the polarizing planes of the sections 11 and 12. The lens 14 may be oriented to polarize light in a horizontal plane while the lens 15 is oriented to polarize light in a vertical plane. Therefore, only the portion of the object 17 positioned behind the section 12 may be seen through the lens 14, since together the section 11 and lens 14 substantially eliminate or filter out all of the light incident upon the two because only vertical light vibrations can pass through the section 11 and only horizontal light vibrations can pass through the lens 14. In the same manner, only the portion of the object 17 positioned behind the section 11 can be seen through the lens 15, since together the section 12 and lens 15 filter out all of the light incident upon the two.

It is seen, then, that the polarized and colored light filters both function in the same manner and embrace the same inventive concept. The combination of the filter sections 11 and 12 with the lenses 14 and 15 cooperate to filter out substantially all of the visible light incident on the filter and lenses having complementary subtractive light filtering properties, and the phrase complementary subtractive as used herein implies this idea.

In operation, the glasses 13 are placed upon the patient and the filter 10 is interposed in the line of sight between the patient and some object of interest 17 which may, for example, be the cathode ray tube or picture tube of a television receiver. The screen or filter 10 is adjusted so that the object must be seen through the sections 11 and 12 and, if necessary, the filter may be axially aligned with the glasses so that the object cannot be seen through both of the lenses 14 and 15 and any one of the sections. The light emanating from or reflected from the object 17 must pass through the filter sections 11 and 12 to reach the eyes of the patient, and portions of the light spectrum will be filtered out by the sections 11 and 12 in the manner previously described. The lenses 14 and 15 will also operate to filter out portions of the light spectrum, and since each of the lenses has light filtering properties that are complementary subtractive to one of the sections 11 or 12, the patient must use both eyes simultaneously to see the entire object. Training in the simultaneous use of both eyes is thereby accomplished. The operating procedure is the same whether the filter sections and lenses comprise polarizing light filters or colored light filters.

Thus, it is seen that I provide apparatus that can be used in training persons suffering from the class of visual defects described to use both of their eyes together while viewing an object. The more training the patient has in using both of his eyes simultaneously, the more quickly he will conquer the visual defects. My apparatus permits training over long periods, since the viewed objects may be entertaining or otherwise attractive to the patient and he will therefore enjoy watching the object. In his effort to see the entire object—for example, the program being shown on a television receiver—the patient begins unconsciously to use both eyes and the period of training necessary to conquer the defect is substantially decreased.

While in the foregoing specification I have set forth specific apparatus in considerable detail for purposes of illustration, it is obvious that the details of my invention may be varied greatly by those skilled in the art without departing from the spirit and scope thereof.

I claim:

1. In apparatus of the character set forth, a pair of spaced-apart light filters through both of which an object is to be viewed, one of said filters being a substantially motionless screen providing at least two sections having different light filtering properties and the other of said filters being a pair of lenses, each lens having light filtering properties that are complementary subtractive to the filtering properties of one of said sections, whereby each of said sections and lenses restricts a portion of the visible light spectrum incident thereon and only a part of the light passes therethrough, and the complementary subtractive filtering properties of a lens and section together restrict and filter out substantially all of the light, said screen being adapted to be interposed between an object to be viewed and said lenses.

2. In apparatus of the character substantially as described, a pair of spaced-apart light filters in substantially axial alignment for viewing therethrough objects illuminated with natural light rays, one of said filters being a substantially motionless transparent screen providing at least two sections having complementary subtractive light filtering properties and the other of said filters being a pair of glasses equipped with lenses, each of said lenses being transparent and having light filtering properties that are complementary subtractive to the filtering properties of one of said sections, whereby each of said sections and lenses restricts a portion of the visible light spectrum incident thereon and only a part of the light passes therethrough, and the complementary subtractive filtering properties of a lens and section together restrict and filter out substantially all of the light, said screen being adapted to be directly interposed between an object to be viewed and said glasses.

3. In apparatus of the character described, a light filter having at least two sections of different color, and a pair of colored lenses spaced from said filter, said light filter and lenses being adapted to be aligned along a sight path for viewing substantially any selected object and the like therethrough, the color of one of said lenses being complementary to the color of one of said sections and the color of the other lens being complementary to the color of the other section, whereby the complementary colors comprise a subtractive light filter with the result that visible light is substantially absorbed by the complementary colors, said filter being substatnially motionless and being adapted to be placed intermediate an object to be viewed and said lenses.

4. In apparatus of the character set forth for viewing selected objects and the like illuminated by ordinary light, a transparent screen providing at least two differently colored filter sections positioned in substantially longitudinal alignment whereby each section filters out substantially different portions of the visible light spectrum passing therethrough, and a pair of glasses equipped with colored lenses and spaced from said screen and being in substantially axial alignment therewith, the color of each lens being complementary to the color of one of said sections, whereby the complementary colors comprise a subtractive light filter with the result that visible light is substantially absorbed by the complementary colors.

5. In apparatus for use in the treatment of visual defects wherein training in the simultaneous use of both eyes is corrective, a transparent light filter providing at least two colored sections, the colors being complementary, and a pair of lenses spaced from said filter and being adapted to filter light, each of said lenses being colored with a color complementary to the color of one of the sections, whereby a section and a lens of complementary colors comprise a complementary subtractive light filter absorbing substantially all of the visible light spectrum passing therethrough, said filter being substantially motionless and interposed between an object to be viewed and said lenses.

6. In apparatus of the character described for viewing selected objects and the like illuminated by ordinary light, a light filter having at least two light-polarizing sections oriented to polarize light passing therethrough in planes substantially at right angles to each other, and a pair of light-polarizing lenses spaced from said filter, said lenses being oriented to polarize light passing therethrough in planes substantially at right angles to each other and substantially parallel with the polarizing planes of said sections, whereby visible light is restricted to vibrations in a single plane by each of said sections and lenses with the result that a lens and a section having polarizing planes oriented at substantially right angles to each other filter out substantially all of the visible light, said filter being substantially motionless and interposed between an object to be viewed and said lenses.

7. In apparatus of the character set forth for viewing selected objects and the like illuminated by ordinary light, a substantially motionless light filter providing at least two light-polarizing sections in substantially longitudinal alignment and having polarizing planes disposed at substantially right angles to each other, and a pair of glasses spaced from said filter and in substantially axial alignment therewith and having light-polarizing lenses providing polarizing planes in substantially parallel relation with the polarizing planes of said sections, whereby visible light is restricted to vibrations in a single plane by each of said sections and lenses with the result that a lens and a section having polarizing planes oriented at substantially right angles to each other filter out substantially all of the visible light.

8. The apparatus of claim 1 in combination with the viewing screen of a television receiver, said first mentioned screen and said lenses being positioned in front of the picture tube in said receiver.

9. In combination with a visible object or the like wherein the light rays making the same visible are normal and undisturbed, means for changing such rays at a remote location into at least two distinct components of predetermined characteristics, comprising a pair of lenses, one for each eye of the viewer of the object, said lenses having complementary subtractive light filtering properties, and a screen interposed in longitudinal alignment between said lenses and said object so that one viewing the object must do so through the lenses and screen, said screen providing at least two sections, each having light filtering properties complementary subtractive respectively to said lenses, the screen being dimensionally arranged and positioned with respect to said lenses and object so that the entire object cannot be viewed through a single lens and one of said sections, whereby to view the object in its entirety, both lenses must be employed.

10. In apparatus useful as a corrective training aid in the treatment of binocular vision, a pair of lenses having respectively distinct light filtering properties, and a screen providing at least two sections, each having light filtering properties complementary subtractive respectively to one of said lenses, said lenses and screen being adapted to be arranged in longitudinal alignment with an object made visible by normal light rays and in spaced relation with each other so that the entire object cannot be viewed through either of said lenses and one of said sections, whereby to view an object in its entirety through said lenses and screen, both eyes of the viewer must be used simultaneously.

11. A visual training device for use in treating individuals having a tendency to suppress vision in one eye comprising a visual field of fixed size and shape having moving form characters thereon positioned within the field of vision of the eyes of an individual, viewing means embodying a pair of lenses adapted to be positioned before the eyes of an individual and through which the visual field is adapted to be viewed, said lenses each embodying different light-altering characteristics, and light-altering means interposed between said viewing means and said visual field comprising a pair of portions having different light-altering characteristics for cooperation with the respective lenses of said viewing means to render selected areas of said visual field visible to the respective eyes of the viewer whereby the use of both eyes of the individual is required to see the whole of said visual field.

12. Eye training apparatus for use with a device providing a visual field of fixed size and shape having moving form characters thereon to stimulate an observer's interest comprising a transparent member adapted to be interposed between an observer under training and said visual field and divided into two adjacent principal areas having light-polarizing characteristics, the axis of polarization of said areas being substantially at right angles to each other, and a pair of polarizing analyzers adapted to be located before the eyes of said observer and having their axes of polarization at substantially right angles to each other and each parallel with the axis of polarization of one of said areas of the transparent member to render selected areas of said visual field visible to the respective eyes of the observer whereby the use of both eyes of the observer is required to see the whole of said visual field.

13. A visual training device for use in treating individuals having a tendency to suppress vision in one eye comprising a visual field of fixed size and shape having moving form characters therein positioned within the field of vision of the eyes of an individual to stimulate his interest, viewing means embodying a pair of light-polarizing analyzers adapted to be positioned before the eyes of an individual and through which the visual field is adapted to be viewed, the respective axes of polarization of said analyzers being substantially at right angles to one another, and light-altering means adapted to be interposed between said viewing means and said visual field comprising a pair of polarizing portions wherein the axes of polarization of the respective portions are substantially at right angles to one another and substantially parallel with the axes of polarization of the respective analyzers of said viewing means to render selected areas of said visual field visible to the respective eyes of the viewer whereby the use of both eyes of the individual is required to see the whole of said visual field.

References Cited in the file of this patent

UNITED STATES PATENTS

| | | |
|---|---|---|
| 2,233,689 | Wildebush | Mar. 4, 1941 |
| 2,238,207 | Ames et al. | Apr. 15, 1941 |
| 2,280,297 | Neumuller et al. | Apr. 21, 1942 |
| 2,618,259 | Alexander | Nov. 18, 1952 |
| 2,670,654 | Norman | Mar. 2, 1954 |
| 2,676,588 | Shamsky | Apr. 27, 1954 |

FOREIGN PATENTS

| | | |
|---|---|---|
| 552,582 | Great Britain | Apr. 15, 1943 |